United States Patent
Li et al.

(10) Patent No.: US 10,789,742 B2
(45) Date of Patent: Sep. 29, 2020

(54) RECONSTRUCTING IMAGES

(71) Applicant: Shanghai Neusoft Medical Technology Co., Ltd., Shanghai (CN)

(72) Inventors: Yunda Li, Shenyang (CN); Zhipeng Sun, Shenyang (CN); Shaolian Liu, Shenyang (CN)

(73) Assignee: Shanghai Neusoft Medical Technology Co., Ltd., Shanghai (CN)

( * ) Notice: Subject to any disclaimer, the term of this patent is extended or adjusted under 35 U.S.C. 154(b) by 179 days.

(21) Appl. No.: 16/118,392

(22) Filed: Aug. 30, 2018

(65) Prior Publication Data
US 2019/0108659 A1  Apr. 11, 2019

(51) Int. Cl.
*G06T 11/00* (2006.01)
*G06T 5/00* (2006.01)
*G06T 5/10* (2006.01)

(52) U.S. Cl.
CPC ............ G06T 11/006 (2013.01); G06T 5/002 (2013.01); G06T 5/10 (2013.01); *G06T 2207/10104* (2013.01); *G06T 2207/20064* (2013.01); *G06T 2211/424* (2013.01)

(58) Field of Classification Search
None
See application file for complete search history.

(56) References Cited

U.S. PATENT DOCUMENTS

| 7,260,269 B2 * | 8/2007 | Guleryuz | H04N 19/895 375/240.18 |
|---|---|---|---|
| 2001/0014140 A1 * | 8/2001 | Proksa | A61B 6/032 378/15 |
| 2013/0272490 A1 * | 10/2013 | Noguchi | A61B 6/4441 378/4 |
| 2014/0029819 A1 * | 1/2014 | Zeng | G06T 11/006 382/131 |
| 2015/0287223 A1 * | 10/2015 | Bresler | G06T 11/006 382/131 |

(Continued)

FOREIGN PATENT DOCUMENTS

| CN | 102968762 A | 3/2013 |
|---|---|---|
| CN | 103390285 A | 11/2013 |

(Continued)

OTHER PUBLICATIONS

Jijun Tong, Jin Liu, Yanqin Kang, Qiang Cai; The PET Image Reconstruction Based on TOF and Sparse Regularization; Journal of Computer-Aided Design & COmputer Graphics; vol. 27 No. 5, May 2015.

(Continued)

*Primary Examiner* — Fayyaz Alam (74) *Attorney, Agent, or Firm* — Kilpatrick Townsend & Stockton, LLP (57) ABSTRACT

Methods, devices and apparatus for reconstructing an image are provided. According to an example of the method, scanning data is obtained for a scanned subject, an initially-updated image is reconstructed from the scanning data, image boundary prior information is generated by performing at least two sparse transforms on the initially-updated image, and a reconstructed image is obtained by performing a weighted reconstruction with the image boundary prior information and the initially-updated image.

19 Claims, 4 Drawing Sheets

(56) References Cited

U.S. PATENT DOCUMENTS

2017/0154413 A1* 6/2017 Yu .................. G06K 9/6247
2019/0197674 A1* 6/2019 Bai .................. G06K 9/6232

FOREIGN PATENT DOCUMENTS

CN   104077763 A   10/2014
CN   104240210 A   12/2014

OTHER PUBLICATIONS

Essam A Rashed, Hiroyuki Kudo; Statistical image reconstruction from limited projection data with intensity prior; Physics in medicine and biology, 57 (2012) 2039-2061.

State Intellectual Property Office of the People's Republic of China, Office Action and Search Report Issued in Application No. 201710930115.4, dated Jul. 31, 2019, 18 pages,(Submitted with Machine Translation).

Yunda Li, et al, "Compressive sensing algorithm for 2D reconstruction of THz digital holography" Chinese Optics Letters, Jan. 30, 2015. 4 pages.

Huiyue Zhang, "Research of Image Reconstruction and Restoration Based on Compressed Sensing Theory" Northeastern University, Mar. 13, 2017, 85 pages.

* cited by examiner

RECONSTRUCTING IMAGES

This application claims priority to Chinese Patent Application No. 2017109301154 filed on Oct. 9, 2017, the entire content of which is incorporated herein by reference.

BACKGROUND

In imaging diagnosis technologies of a medical field, many medical imaging methods may cause a subject to be exposed to a particular dose of radiation. For example, during or for a Positron Emission Tomography (PET) process, a radioactive tracer may be injected into a subject to obtain imaging data by detecting y-photon pairs released from positron annihilation events occurring in the body with PET detectors.

NEUSOFT MEDICAL SYSTEMS CO., LTD. (NMS), founded in 1998 with its world headquarters in China, is a leading supplier of medical equipment, medical IT solutions, and healthcare services. NMS supplies medical equipment with a wide portfolio, including CT, Magnetic Resonance Imaging (MRI), digital X-ray machine, ultrasound, Positron Emission Tomography (PET), Linear Accelerator (LINAC), and biochemistry analyser. Currently, NMS' products are exported to over 60 countries and regions around the globe, serving more than 5,000 renowned customers. NMS's latest successful developments, such as 128 Multi-Slice CT Scanner System, Superconducting MRI, LINAC, and PET products, have led China to become a global high-end medical equipment producer. As an integrated supplier with extensive experience in large medical equipment, NMS has been committed to the study of avoiding secondary potential harm caused by excessive X-ray irradiation to the subject during the CT scanning process.

BRIEF SUMMARY OF THE INVENTION

One inventive aspect is a method of reconstructing an image. The method includes obtaining scanning data generated by scanning a subject, processing the scanning data to generate an initially-updated image, performing a first sparse transform on the initially updated image to generate a first transformed image, and performing a second sparse transform on the first transformed image to generate image boundary prior information. The method also includes performing a weighted reconstruction on the image boundary prior information and the initially-updated image to generate a reconstructed image.

Another inventive aspect is a device for reconstructing an image. The device includes a processor configured to execute machine readable instructions encoding control logic for reconstructing the image, the instructions being read from a machine readable storage medium. Executing the machine readable instructions cause the processor to obtain scanning data generated by scanning a subject, process the scanning data to generate an initially-updated image, perform a first sparse transform on the initially updated image to generate a first transformed image, and perform a second sparse transform on the first transformed image to generate image boundary prior information. The processor is also caused to perform a weighted reconstruction on the image boundary prior information and the initially-updated image to generate a reconstructed image.

Another inventive aspect is a machine-readable storage medium coupled to a processor and having machine-executable instructions stored thereon that, when executed by the processor, cause the processor to perform operations including: obtaining scanning data generated by scanning a subject, processing the scanning data to generate an initially-updated image, performing a first sparse transform on the initially updated image to generate a first transformed image, performing a second sparse transform on the first transformed image to generate image boundary prior information, and performing a weighted reconstruction on the image boundary prior information and the initially-updated image to generate a reconstructed image.

DETAILED DESCRIPTION

With development of medical imaging technologies, to minimize radiation dose received by a subject in an imaging process is a development direction. For example, time-of-flight PET (TOF-PET) estimates an approximate position of an annihilation event by measuring a difference of times that a coincident photon pair reaches detector crystals, and only calculates projection values generated by pixels near the position of annihilation. In this way, image quality can be ensured and an administered dose injected into the subject is lowered, thereby reducing radiation.

However, when the injection dose or data acquisition time are further reduced to improve detection efficiency and lower radiation, problems of increased noise and decreased signal-to-noise ratio may occur to an image and thus the quality of the reconstructed image cannot be guaranteed.

When dealing with low dose scenario, the projection data is relative less, and the image reconstruction in this scenario may be referred to as "low-dose reconstruction".

A key for the low-dose reconstruction is to ensure the quality of the reconstructed image, so that the reconstructed image may still have a good image effect in the case of relative less projection data. A Compressed Sensing (CS) theory may be applied to a low-dose reconstruction. According to the CS theory, a relatively good image can be reconstructed by using a relatively small amount of measuring values based on prior knowledge of sparsity of the image. As known from experience, after sparse transform is performed on a medical image, most of numerical values are equal to or approximate to zero, and thus the image may be considered as sparse. Based on this, a method of reconstructing a low dose image may be obtained, that is, an initial medical image is reconstructed based on scanning data and then transformed by at least two sparse transforms to conform to the CS theory, finally image reconstruction is performed based on the CS theory.

The present disclosure provides a method of reconstructing an image from a low-dose scan in medical imaging technologies. According to the method, detailed information such as an image boundary can be better reserved, the quality of the reconstructed image can be improved, and calculation method is relative simple, thereby solving the problem of decreased quality of low-dose reconstruction.

In the following description of the method of reconstructing an image in the present disclosure, image reconstruction of TOF-PET will be taken as an example. According to the TOF-PET, an image may be reconstructed under a condition of a relative low injection dose and shorter acquisition time. However, it is understood that the method of the present disclosure is not limited to reconstructing images of TOF-PET. Other non-TOF PET images, or images obtained by other imaging techniques may also utilize the image reconstruction method of the present disclosure.

Figure 1:
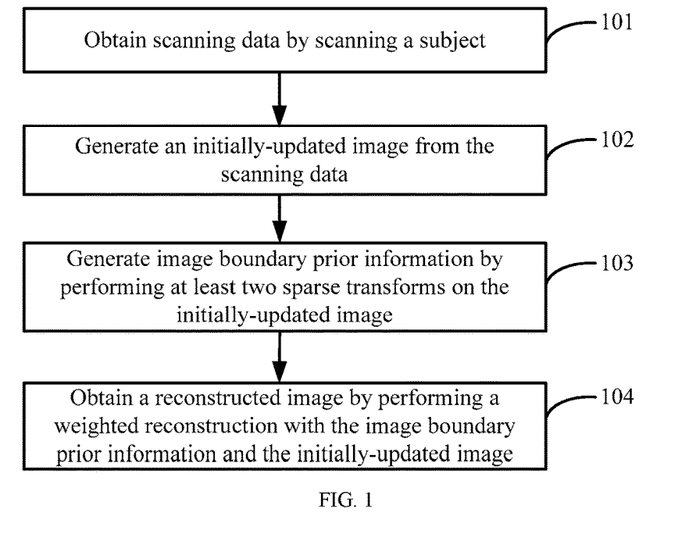
FIG. 1 is a flowchart illustrating a process of a method of reconstructing an image according to an example of the present disclosure.

FIG. 1 is a flowchart illustrating a process of a method of reconstructing an image according to an example of the present disclosure. The method may include the following blocks.

At block 101, scanning data is obtained by scanning a subject.

For example, the scanning data at block 101 may be PET scanning data.

The scanning data obtained at block 101 may be obtained by injecting a low administered dose into the subject or in shorter data acquisition time.

At block 102, an initially-updated image is generated from the scanning data.

For example, an initial image obtained by a normal iterative reconstruction algorithm or an analytic reconstruction algorithm from the scanning data may be referred to as the initially-updated image. The initially-updated image at block 102 may be used as a basis for performing sparse transform at next block.

At block 103, image boundary prior information is generated by performing at least two sparse transforms on the initially-updated image.

For example, the sparse transforms may include a gradient transform and a wavelet transform and may also include other sparse transforms with similar functions.

The sparse transforms may be performed on the initially-updated image at block 103. For example, the gradient transform may be firstly performed on the initially-updated image to obtain a gradient image, and the wavelet transform is then performed on the gradient image to obtain a wavelet domain sub-image. The purpose of performing the sparse transforms is to obtain an image retaining only a boundary. The image retaining only the boundary may be referred to as image boundary prior information.

The manner of performing at least two sparse transforms on an image may be referred to as a hybrid sparse transform. In a single sparse transform, the image may be excessively smooth and part of image details may be filtered out, resulting in that basic information of the image may not be reserved well. In a hybrid sparse transform, different sparse transforms may correspond to different information of an image, so that the image theoretically retaining only the boundary is obtained as prior information for subsequent processing, thereby a subsequently reconstructed image may have better image quality. Meanwhile, in the hybrid sparse transform, an obtained transformation result may have better sparsity, and therefore, a hybrid sparse transform may theoretically satisfy the requirements of the CS theory better than a single sparse transform.

At block 104, a reconstructed image is obtained by performing a weighted reconstruction with the image boundary prior information and the initially-updated image.

At block 104, a weighted processing may be performed for the image boundary prior information obtained at block 103 and the initially-updated image obtained at block 102. In an example, during the weighted processing, a weighting factor of image boundary information may be increased by using the image boundary prior information in an image reconstructing process, so that the boundary of the reconstructed image for a low dose is as clear as a reconstruction result for a normal dose. After the weighted processing, an iterative update formula of a higher weighting factor of boundary information may be obtained, or a basic image that inherits a clear boundary may be obtained.

After the image boundary prior information is inherited to the initially-updated image, a reconstruction process may be continued to obtain a reconstructed image. In an example, the image boundary prior information may be used as a weighting factor for an iterative update formula. An iterative update operation may be further performed on the initially-updated image according to the iterative update formula. Due to the iterative update formula introducing the weighting factor, the reconstructed image may have clear boundary and good image quality.

In the method of reconstructing an image in this example, at least two sparse transforms are performed for an image, for example, wavelet transform is further performed on a gradient image, so that the transformation result has better sparsity, more information required for describing the image is reserved and the calculation technique of the hybrid sparse transform is relatively simple. Image boundary prior information based on the sparse transforms is obtained by the sparse transforms. A reconstructed image is obtained by performing a weighted reconstruction with the image boundary prior information and the initially-updated image. Comparing with the result obtained by the single sparse transform, quality of the reconstructed image obtained by this method is obviously improved.

In one embodiment, a reconstructed image may be obtained by several methods. In an example of the present disclosure, a simple processing method is provided. That is, image boundary prior information obtained by a hybrid sparse transform is introduced into an iterative update formula by means of a weighting factor, and the image is reconstructed according to the iterative update formula.

A specific process will be described below by taking TOF-PET as an example.

Figure 2:
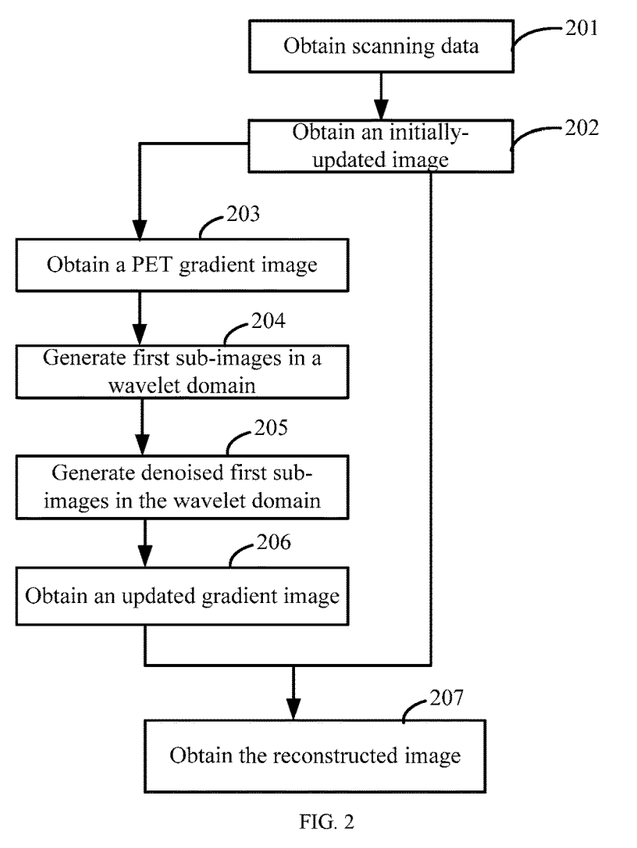
FIG. 2 is a flowchart illustrating a process of a method of reconstructing an image according to another example of the present disclosure.

FIG. 2 is a flowchart illustrating a process of a method of reconstructing an image according to an example of the present disclosure. In the example, a reconstructed image is obtained by performing iterative update with a gradient descent algorithm, in which a weighting factor may be introduced in an iterative update formula. An optimal solution of the iterative update formula indicates the reconstructed image. As shown in FIG. 2, the method of reconstructing an image may include the following blocks.

At block 201, scanning data is obtained by scanning a subject. The scanning data obtained at this block may be acquired when a low administered dose is injected into the scanned subject, or when data acquisition time is short.

At block 202, an initially-updated image is obtained according to a TOF iterative reconstruction algorithm.

At block 202, an initially-estimated image and an initial reconstruction parameter may be set, where the initially-estimated image may be obtained by reconstructing the scanning data at block 201 through a Filtered Back Projection (FBP) algorithm. Then the initially-updated image may be obtained by performing iteration based on the TOF iterative reconstruction algorithm. For example, a PET Ordered Subset Expectation Maximization (OSEM) iterative reconstruction formula (1) based on TOF information is as follows:

$$f_j^{n+1} = f_j^n \left( \frac{1}{\sum_{i,t} p_{ijt} c_{ij}} \right) \sum_{i \in I_j} c_{ij} \sum_{t \in T} \frac{p_{ijt} Y_{it}}{p_{ijt} c_{ij} f_j^n}, \quad (1)$$

where n refers to a number of iterations, $f_j$ refers to pixel value of a j-th pixel in an image to be reconstructed, $Y_{it}$ refers to integral count rate along the i-th projection (e.g., a ray received by the i-th detector unit) for the time being t in the sinogram, $c_{ij}$ refers to a probability that a photon emitted from the -th pixel of the image is received by the i-th detector, $I_j$ refers to a subset of i-th projection passing through the j-th pixel, p refers to a TOF Gaussian kernel function, and $p_{ijt} c_{ij}$ refers to a probability that the i-th projection line passes through the j-th pixel of the image for TOF time difference information being t.

The above process of obtaining the initially-updated image may be executed by using a conventional technique, which will not be described herein.

At block 203, a PET gradient image is obtained by performing a gradient transform for the initially-updated image.

At block 204, first sub-images in a wavelet domain are generated by performing a wavelet transform for the PET gradient image.

At block 204, corresponding low-frequency sub-images and corresponding high-frequency sub-images, for example, one low-frequency sub-image and three high-frequency sub-images, may be obtained by performing a wavelet transform on the PET gradient image. Since the gradient image mainly includes image boundary information, main components of the wavelet transform are high-frequency components.

At block 205, denoised first sub-images in the wavelet domain are generated by denoising the first sub-images in the wavelet domain.

Due to influences of factors such as a PET imaging mechanism and a count rate of scanning data, noise of a PET image is relatively obvious. The gradient image includes noise information in addition to image boundary information, thus it is required to take measures to denoise the gradient image. Since the wavelet transform may decompose an image into a series of frequency representations which may fully reflect local changing characteristics of the image, the wavelet transform has a strong capability to remove data correlation. In the PET imaging mechanism, energy of signals is concentrated in some large wavelet coefficients in the wavelet domain, but the energy of noise is distributed in the whole wavelet domain. Therefore, after wavelet decomposition, wavelet coefficient amplitude of the signals is greater than coefficient amplitude of the noise, that is, the wavelet coefficients with larger amplitude are mainly signals, and the wavelet coefficients with smaller amplitude are mainly noise. Thus, various techniques, for example, a threshold technique, may be implemented to remove the noise and reserve the signal information as much as possible.

At block 206, an updated gradient image is obtained by performing a wavelet inverse transform on the denoised first sub-images in the wavelet domain and taken as image boundary prior information.

At block 206, the wavelet inverse transform is performed on scaling factors and denoised wavelet coefficients to obtain the updated gradient image $f_{gradient\_new}$. Compared with the PET gradient image obtained at block 203, values at noise positions of the updated gradient image $f_{gradient\_new}$ may be very small or negligible, and substantially only the image boundary information is substantially preserved. The updated gradient image becomes sparser and more compliant with the CS theory.

In this example, after blocks 203 to 206, the updated gradient image, that is, the image boundary prior information, may be obtained without performing further calculation. The gradient transform, the wavelet transform and the wavelet domain denoising are all common algorithms in this field. Compared with the prior art that needs to calculate a partial derivative and then perform alternating iteration for updating calculation, the method of the present disclosure may be implemented more simply.

At block 207, the reconstructed image is obtained by performing iteration based on an iterative update formula in which the image boundary prior information functions as a weighting factor to iteratively update the initially-updated image.

At this block, a problem of reconstructing the PET image may be converted into a problem for solving an optimal solution of a target function. For example, the optimal solution may be solved for the target function based on a Total Variation (TV) target function. When solving the target function, iterative update may be performed for the target function by the gradient descent method to achieve the optimal solution.

As shown in FIG. 2, at block 207, an iterative update formula (2) is obtained as follows by combining the initially-updated image obtained at block 202 and the update gradient image obtained at block 206:

$$f^{j'} = f^j + f_{gradient\_new} h^j p^j \quad (2),$$

$$p^j = -\nabla \|f^j\|_{TV} \quad (2\text{-}1)$$

where $h^j$ refers to an iteration step length, $p^j$ refers to a searching direction, and $f^j$ indicates the initially-updated image obtained at block 202. Since a negative gradient direction is a direction in which a value of function $f^j$ descends fastest, the search should be performed along the negative gradient direction, that is, the searching direction is the negative gradient direction. The iteration step length is then determined. Iterate until an iteration stopping condition is satisfied. Further, since the updated gradient image $f_{gradient\_new}$ is introduced as the prior information for the iterative update formula (2), the prior information increases weight of the image boundary information, so that the boundary information of the reconstructed image is reserved better. Further since the weight of the noise is smaller, the noise of the reconstructed image is weakened.

The iterative update is performed according to the formula (2), until the reconstruction result satisfies a preset constraint or a preset number of iterations are reached. The result is the reconstructed image. The constraint may be that the difference between the results of the two iterations is less than a preset threshold.

According to the method of reconstructing an image in this example, the updated gradient image is obtained as prior information by denoising the gradient image of the initially-updated image in the wavelet domain. The updated gradient image may be introduced as a weighting factor into the iterative update formula, so that the reconstructed image retains the details such as image boundary while being denoised. In this way, the quality of the reconstructed image is obviously improved, and also the method of reconstructing the image is relatively simple in calculation, thereby improving reconstruction efficiency.

Figure 3:
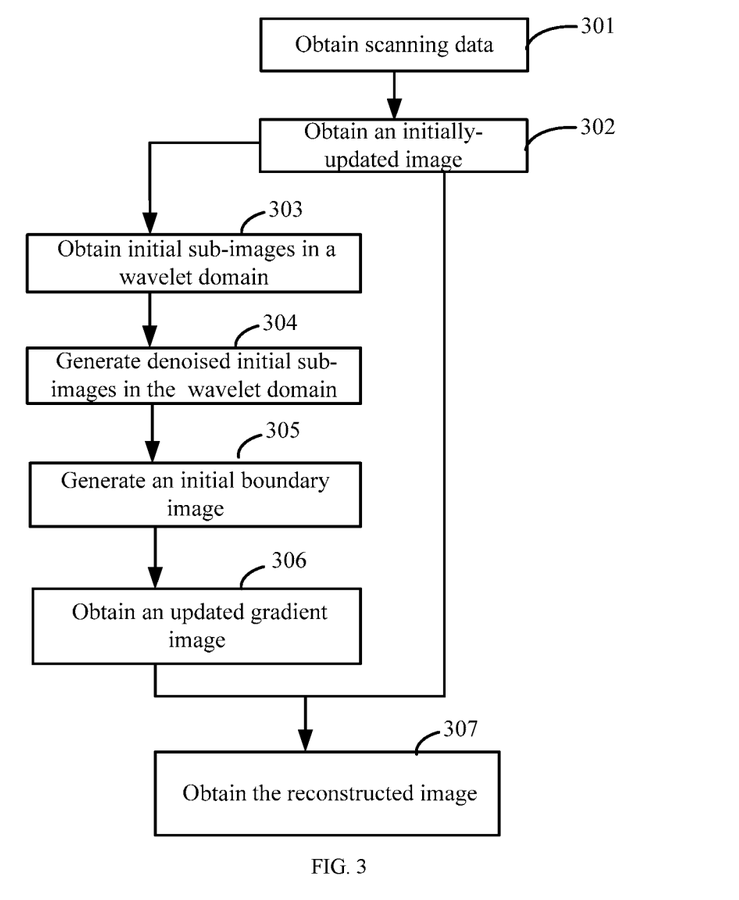
FIG. 3 is a flowchart illustrating a process of a method of reconstructing an image according to still another example of the present disclosure.

FIG. 3 is a flowchart illustrating a process of a method of reconstructing an image according to another example of the present disclosure. In the example, wavelet transform is firstly performed, and then, gradient transform is performed.

At block 301, scanning data is obtained by scanning a subject.

At block 302, an initially-updated image is obtained based on a TOF iterative reconstruction algorithm.

The process of obtaining the initially-updated image at block 302 may be similar with that at block 202, which will not be repeated herein.

At block 303, initial sub-images in a wavelet domain is obtained by performing a wavelet transform on the initially-updated image, where the initial sub-images in the wavelet domain may be one low-frequency sub-image and three high-frequency sub-images.

At block 304, denoised initial sub-images in the wavelet domain is generated by denoising the initial sub-images in the wavelet domain.

Since boundary information is mainly high-frequency components, and energy of noise is distributed in the whole wavelet domain, after wavelet decomposition, wavelet coefficient amplitude of the signals is greater than coefficient amplitude of the noise, that is, the wavelet coefficients with larger amplitude are mainly signals, and the wavelet coefficients with smaller amplitude are mainly noises. Thus, some techniques, for example, a threshold techniaue, may be employed to remove the noise and reserve signal information as much as possible.

At block 305, an initial boundary image is generated by performing a wavelet inverse transform on the denoised initial sub-images in the wavelet domain.

At block 306, an updated gradient image $f_{gradient\_new}$ is obtained by performing a gradient transform on the initial boundary image and taken as image boundary prior information.

Compared with the initial boundary image obtained at block 305, the updated gradient image $f_{gradient\_new}$ obtained by further performing gradient transform has more obvious image boundary information and becomes sparser, and thus is more compliant with the CS theory.

At block 307, the reconstructed image is obtained by performing iteration based on an iterative update formula in which the image boundary prior information functions as a weighting factor to iteratively update the initially-updated image.

The process of reconstructing the image at block 307 is similar with that at block 207, which will not be described herein.

According to the method of reconstructing an image in this example, the updated gradient image is obtained as prior information by denoising the initially-updated image in the wavelet domain and then performing gradient transform. The updated gradient image may be introduced into the iterative update formula as a weighting factor, so that the reconstructed image retains the details such as image boundary while being denoised. Thus, the quality of the reconstructed image is obviously improved, and the method of reconstructing an image is relatively simple in calculation, thereby improving reconstruction efficiency.

Figure 4:
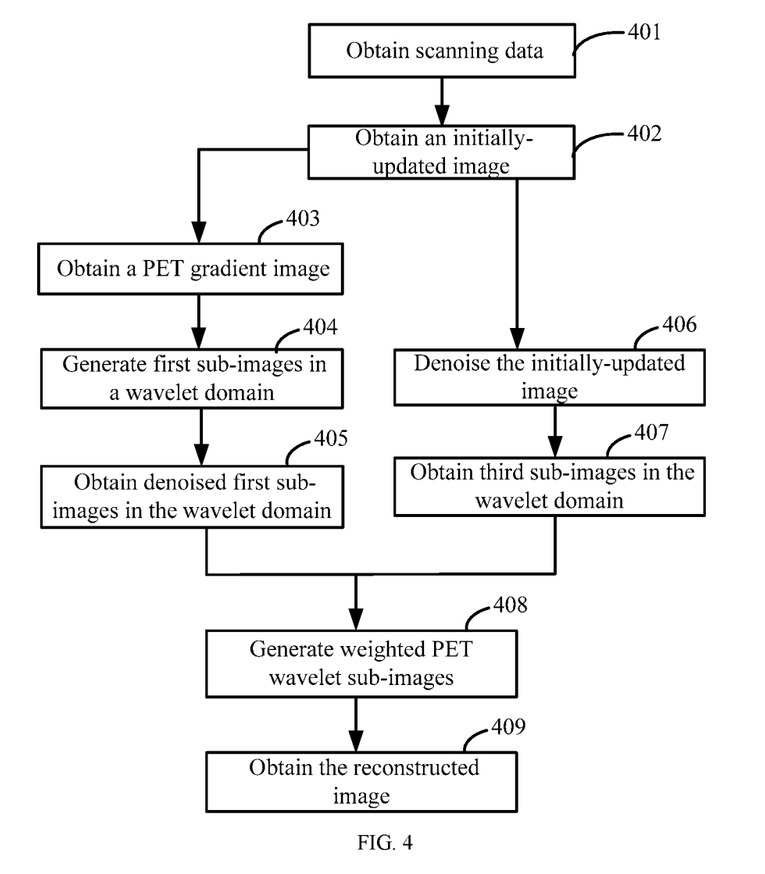
FIG. 4 is a flowchart illustrating a process of a method of reconstructing an image according to yet another example of the present disclosure.

FIG. 4 is a flowchart illustrating a process of a method of reconstructing an image according to still another example of the present disclosure. In this example, the initially-updated image inherits the clear boundary characteristic by weighted stacking the sub-images obtained by wavelet transform, and then reconstructed image is generated by wavelet inverse transform. As shown in FIG. 4, the method may include the following blocks.

At block 401, scanning data is obtained by scanning a subject. The scanning data obtained at this block may be acquired after a low administered dose is injected into the scanned subject, or when data acquisition time is short.

At block 402, an initially-updated image is obtained according to a TOF iterative reconstruction algorithm.

At block 402, an initially-estimated image and an initial reconstruction parameter may be set. The initially-estimated image may be obtained by reconstructing the scanning data at block 401 based on an FBP algorithm. Then, the initially-updated image may be obtained by performing iteration based on the TOF iterative reconstruction algorithm.

As shown in FIG. 4, after the initially-updated image is obtained, the initially-updated image may be processed in two aspects: in one aspect, the sparse transforms at block 403 to block 405 is performed, and in the other aspect, the wavelet transform at blocks 406 and 407 is performed.

At block 403, a PET gradient image is obtained by performing a gradient transform for the initially-updated image.

At block 404, first sub-images in a wavelet domain are generated by performing a wavelet transform on the PET gradient image.

At block 404, corresponding low-frequency sub-images and corresponding high-frequency sub-images, for example, one low-frequency image and three corresponding high-frequency sub-images, may be obtained by performing a wavelet transform on the PET gradient image. Since the gradient image mainly includes image boundary information, main components of the wavelet transform are high-frequency components.

At block 405, denoised first sub-images in the wavelet domain are obtained by denoising first sub-images in the wavelet domain.

The denoised first sub-image in the wavelet domain may include one low-frequency sub-image and three high-frequency sub-images. The denoised first sub-images may be taken as image boundary prior information.

At block 406, the initially-updated image is denoised.

For example, a uniformly-distributed image may be obtained by denoising the initially-updated image in the image domain or in the frequency domain.

At block 407, third sub-images in the wavelet domain are obtained by performing a wavelet transform on the denoised initially-updated image. The third sub-images in the wavelet domain may also include one low-frequency sub-image and three high-frequency sub-images.

At block 408, weighted PET wavelet sub-images are generated by a weighted stacking process for each of the denoised first sub-images with one of the third sub-images at corresponding frequency bands in the wavelet domain.

At block 408, the weighted stacking process may be performed on the denoised first sub-images and third sub-images at the corresponding frequency bands in the wavelet domain to fuse information of one image into another image. For example, a weighted stacking is performed on a low-frequency sub-image in the denoised first sub-image and a low-frequency sub-image in the denoised third sub-image. A weighted stacking is performed on a high-frequency sub-image in the denoised first sub-image and a high-frequency sub-image in the denoised third sub-image at the corresponding frequency bands.

The weighted stacking may be, for example, directly adding corresponding sub-images, or performing e-exponential weighting on the corresponding sub-images. In one example, assuming that a pixel value of a pixel of a high-frequency sub-image in the denoised first sub-image is x, and a pixel value of a corresponding pixel of a corresponding high-frequency sub-image in the third sub-image is y. A pixel value of a corresponding pixel in a new high-frequency sub-image may be obtained by adding pixel values x and y. After the weighted stacking is performed, new low-frequency sub-images and new high-frequency sub-images may be obtained and may be referred to as weighted PET wavelet sub-images. Through the weighted stacking, the boundary information of the gradient image may be inherited to the reconstructed image.

At block 409, the reconstructed image is obtained by performing a wavelet inverse transform on the weighted PET wavelet sub-images.

At block 409, the reconstructed image may be obtained by performing a wavelet inverse transform on the low-frequency sub-image and the high-frequency sub-images in the weighted PET wavelet sub-images. The reconstructed image inherits clear boundary characteristics of the gradient image, and may have lower noises due to denoising, so that the reconstructed image contains a clear boundary, and the image noise is inhibited, thereby improving the quality of the reconstructed image.

Further, in one example, the initially-updated image may not be denoised, that is, there is no block 406. Instead, second sub-images in the wavelet domain may be obtained by directly performing wavelet transform on the initially-updated image. At block 408, the weighted PET wavelet sub-image may be obtained by weighted stacking each of the denoised first sub-images with one of the second sub-images at corresponding frequency bands in the wavelet domain.

Further, in the example of FIG. 4, the initially-updated image is denoised in an image domain or a frequency domain. In other examples, other denoising techniques may also be applied, for example, wavelet transform is firstly performed to obtain the second sub-images in the wavelet domain, and denoising is then performed in the wavelet domain. At block 408, the weighted PET wavelet sub-images may be obtained by weighted stacking each of the denoised first sub-images with one of the denoised second sub-images at corresponding frequency bands in the wavelet domain.

According to the method of reconstructing an image in the example, detailed information of one image is fused into another image by using the nature of the wavelet transform. That is, by using a decomposed tower structure to process different decomposition layers and different frequency bands, the clear boundary characteristics are inherited to the sub-images of the initially-updated image. The finally-obtained reconstructed image may also retain the details such as the image boundary while being denoised. In this way, the quality of the reconstructed image is obviously improved. Further, the method is relatively simple in calculation, thereby effectively improving reconstruction efficiency.

It is easily understood that sparse transforms of the present disclosure is not limited to a wavelet transform or a gradient transform, and other transforms such as a discrete cosine transform may also achieve the same purpose.

Figure 5A:
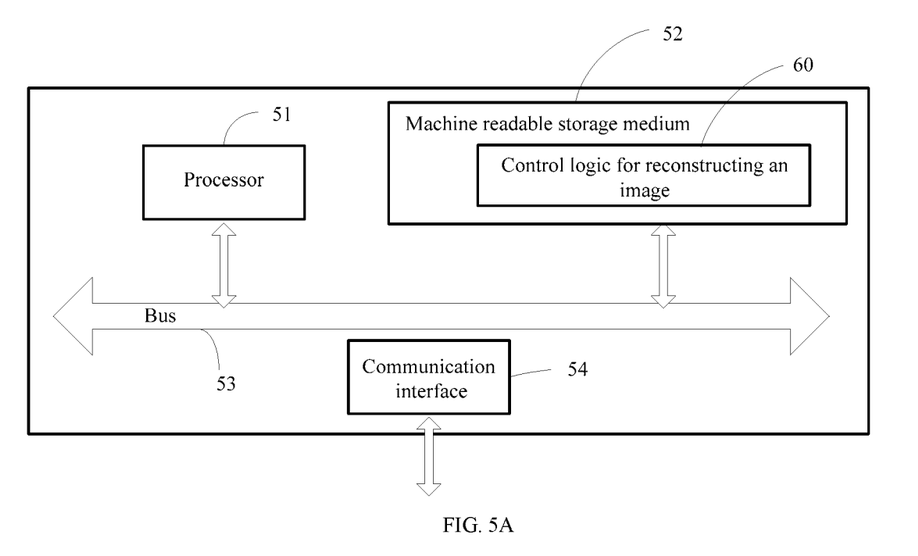
FIG. 5A is a schematic diagram illustrating a hardware structure of a device for reconstructing an image according to an example of the present disclosure.

As shown in FIG. 5A, corresponding to the above method, the present disclosure also provides a hardware device for reconstructing an image. In FIG. 5A, the device includes a processor 51 and a machine-readable storage medium 52, where the processor 51 and the machine-readable storage medium 52 are usually connected with each other via an internal bus 53. In other possible implementations, the device may also include an external interface 54 to communicate with other devices or components.

Figure 5B:
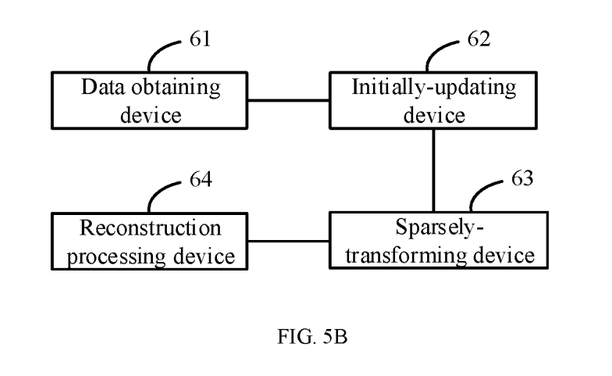
FIG. 5B is a schematic diagram illustrating a functional device of control logic for reconstructing an image according to an example of the present disclosure.

Further, control logic 60 for reconstructing an image is stored on the machine-readable storage medium 52. As shown in FIG. 5B, the control logic may functionally include a data obtaining device 61, an initially-updating device 62, a sparsely-transforming device 63 and a reconstruction processing device 64.

The data obtaining device 61 is configured to obtain scanning data by scanning a subject. For example, the scanning data may be obtained by injecting a low administered dose into the subject or in shorter data acquisition time.

The initially-updating device 62 is configured to generate an initially-updated image from the scanning data.

The sparsely-transforming device 63 is configured to perform at least two sparse transforms on the initially-updated image to obtain image boundary prior information. For example, the at least two sparse transforms may include a gradient transform and a wavelet transform.

The reconstruction processing device 64 is configured to perform weighted reconstruction with the image boundary prior information and the initially-updated image to obtain a reconstructed image.

The device for reconstructing an image in the example performs at least two sparse transforms on an image by the sparsely-transforming device, so that an obtained transformation result has better sparsity and more information required for describing the image is reserved. Further, the calculation method of the hybrid sparse transform is relatively simple. Image boundary prior information is obtained according to the hybrid sparse transform, and then inherited to the initially-updated image so that the quality of the reconstructed image is improved over a result obtained by a single sparse transform.

A process of executing the control logic 60 for reconstructing an image by the device will be further described below by taking software implementation as an example. In this example, the control logic 60 of the present disclosure should be understood as computer instructions stored in the machine-readable storage medium 52. When the processor 51 on the device for reconstructing an image in the present disclosure executes the control logic 60, the processor 51 executes the following operations by invoking the instructions corresponding to the control logic 60 and stored on the machine-readable storage medium 52.

Scanning data is obtained by scanning a subject.

An initially-updated image is generated from the scanning data.

Image boundary prior information is generated by performing at least two sparse transforms on the initially-updated image.

A reconstructed image is obtained by performing a weighted reconstruction with the image boundary prior information and the initially-updated image.

In an example, when the processor obtains the image boundary prior information by reading the machine-executable instructions corresponding to the control logic for reconstructing the image in the machine-readable storage medium, the followings may be specifically included.

A PET gradient image is obtained by performing a gradient transform on the initially-updated image.

First sub-images in a wavelet domain are generated by performing a wavelet transform on the PET gradient image.

Denoised first sub-images in the wavelet domain are generated by denoising the first wavelet domain sub-images in the wavelet domain.

An updated gradient image is obtained by performing a wavelet inverse transform on the denoised first sub-images in the wavelet domain.

The updated gradient image is taken as the image boundary prior information.

Further, when the processor obtains the reconstructed image by reading the machine-executable instructions corresponding to the control logic of reconstructing an image in the machine-readable storage medium, the followings may be specifically included.

The reconstructed image is obtained by performing iteration based on an iterative update formula in which the image boundary prior information functions as a weighting factor to iteratively update the initially-updated image.

In another example, when the processor obtains the image boundary prior information by reading the machine-executable instructions corresponding to the control logic for reconstructing the image in the machine-readable storage medium, the followings may be specifically included.

Initial sub-images in a wavelet domain are obtained by performing a wavelet transform on the initially-updated image.

Denoised initial sub-images in the wavelet domain are generated by denoising the initial sub-images in the wavelet domain.

An initial boundary image is generated by performing a wavelet inverse transform on the denoised initial sub-images in the wavelet domain.

An updated gradient image is obtained by performing a gradient transform on the initial boundary image.

The updated gradient image is taken as the image boundary prior information.

Further, when the processor obtains the reconstructed image by reading the machine-executable instructions corresponding to the control logic of reconstructing an image in the machine-readable storage medium, the followings may be specifically included.

The reconstructed image is obtained by performing iteration based on an iterative update formula, where the iterative update formula in which the image boundary prior information functions as a weighting factor to iteratively update the initially-updated image.

In still another example, when the processor obtains the image boundary prior information by reading the machine-executable instructions corresponding to the control logic for reconstructing the image in the machine-readable storage medium, the followings may be specifically included.

A PET gradient image is obtained by performing a gradient transform on the initially-updated image.

First sub-images in a wavelet domain are generated by performing a wavelet transform on the PET gradient image.

Denoised first sub-images in the wavelet domain are obtained by denoising the first sub-images in the wavelet domain.

The denoised first sub-images in the wavelet domain are taken as the image boundary prior information.

Further, when the processor obtains the reconstructed image by reading the machine-executable instructions corresponding to the control logic of reconstructing an image in the machine-readable storage medium, the followings may be specifically included.

Second sub-images in the wavelet domain are obtained by performing a wavelet transform on the initially-updated image.

Weighted PET wavelet sub-images are generated by weighted stacking each of the denoised first sub-images with one of the second sub-images at corresponding frequency bands in the wavelet domain.

The reconstructed image is obtained by performing a wavelet inverse transform on the weighted PET wavelet sub-images.

The function devices, if implemented in the form of software function devices and sold or used as independent products, may be stored in a machine-readable storage medium. Based on such understanding, the technical scheme of the present disclosure essentially or a part contributing to the technical scheme may be embodied, for example, in the form of a software product, stored in a storage medium, and includes several instructions for enabling a device for reconstruction an image to execute all or part of the blocks of the method disclosed by the examples of the present disclosure. In other embodiments, the technical scheme may be embodied, for example, in the form of a hardware product. The storage mediums include various mediums such as a U disk, a mobile hard disk, a read-only memory (ROM), a random access memory (RAM), a diskette or a compact disk and the like which may store program codes.

A machine-readable storage medium coupled to a processor having machine-executable instructions stored thereon that, when executed by the processor, cause the processor to perform operations including:

obtaining scanning data by scanning a subject;

generating an initially-updated image from the scanning data;

generating image boundary prior information by performing at least two sparse transforms on the initially-updated image; and obtaining a reconstructed image by performing a weighted reconstruction with the image boundary prior information and the initially-updated image.

For simplicity and illustrative purposes, the present disclosure is described by referring mainly to examples. In the above description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the aspects of the present disclosure. As used herein, the terms "a" and "an" are intended to denote at least one of a particular element, the term "includes" means includes but not limited to, the term "including" means including but not limited to, and the term "based on" means based at least in part on.

The above description is merely examples of the present disclosure and is not intended to limit the present disclosure in any form. Although the present disclosure is disclosed by the above examples, the examples are not intended to limit the present disclosure.

Therefore, without departing from the scope of the technical scheme of the present disclosure, based on technical essences of the present disclosure, any alterations, equal changes and modifications fall within the protection scope of the technical scheme of the present disclosure. Accordingly, other embodiments are within the scope of the following claims.

What is claimed is:

1. A method of reconstructing an image, comprising:
obtaining scanning data generated by scanning a subject;
processing the scanning data to generate an initially-updated image;
generating image boundary prior information by performing at least two sparse transforms on the initially-updated image; and
performing a weighted reconstruction on the image boundary prior information and the initially-updated image to generate a reconstructed image.

2. The method according to claim 1, wherein the at least two sparse transforms comprise a gradient transform and a wavelet transform.

3. The method according to claim 1, wherein generating the image boundary prior information comprises:
performing a gradient transform on the initially-updated image to generate a PET gradient image;
performing a wavelet transform on the PET gradient image to generate first sub-images in a wavelet domain;
denoising the first sub-images in the wavelet domain to generate denoised first sub-images in the wavelet domain; and
performing a wavelet inverse transform on the denoised first sub-images in the wavelet domain to generate an updated gradient image,
wherein the updated gradient image comprises the image boundary prior information.

4. The method according to claim 3, wherein the weighted reconstruction performed on the image boundary prior information and the initially-updated image is iterative and is based on an iterative update formula, wherein the image boundary prior information functions as a weighting factor to iteratively update the initially-updated image.

5. The method according to claim 1, wherein generating the image boundary prior information comprises:
performing a wavelet transform on the initially-updated image to generate initial sub-images in a wavelet domain;
denoising the initial sub-images in the wavelet domain to generate denoised initial sub-images in the wavelet domain;
performing a wavelet inverse transform on the denoised initial sub-images in the wavelet domain to generate an initial boundary image;
performing a gradient transform on the initial boundary image to generate an updated gradient image; and
wherein the updated gradient image comprises the image boundary prior information.

6. The method according to claim 5, wherein the weighted reconstruction performed on the image boundary prior information and the initially-updated image is iterative and is based on an iterative update formula, wherein the image boundary prior information functions as a weighting factor to iteratively update the initially-updated image.

7. The method according to claim 1, wherein generating the image boundary prior information comprises:
performing a gradient transform on the initially-updated image to generate a PET gradient image;
performing a wavelet transform on the PET gradient image to generate first sub-images in a wavelet domain;
denoising the first sub-images in the wavelet domain to generate denoised first sub-images in the wavelet domain; and
wherein the denoised first sub-images in the wavelet domain comprises the image boundary prior information.

8. The method according to claim 7, wherein the weighted reconstruction performed on the image boundary prior information in the initially-updated image comprises:
performing a wavelet transform on the initially-updated image to generate second sub-images in the wavelet domain;
performing a weighted stacking operation on each of the denoised first sub-images with one of the second sub-images at corresponding frequency bands in the wavelet domain to generate weighted PET wavelet sub-images; and
performing a wavelet inverse transform on the weighted PET wavelet sub-images to generate the reconstructed image.

9. The method according to claim 7, wherein the weighted reconstruction performed on the image boundary prior information in the initially-updated image comprises:
denoising the initially-updated image;
performing a wavelet transform on the denoised initially-updated image to generate third sub-images in the wavelet domain;
performing a weighted stacking operation on each of the denoised first sub-images with one of the third sub-images at corresponding frequency bands in the wavelet domain to generate weighted PET wavelet sub-images; and
performing a wavelet inverse transform on the weighted PET wavelet sub-images to generate the reconstructed image.

10. A device for reconstructing an image, comprising:
a processor configured to execute machine readable instructions encoding control logic for reconstructing the image, the instructions being read from a machine readable storage medium, wherein executing the machine readable instructions cause the processor to:
obtain scanning data generated by scanning a subject;
process the scanning data to generate an initially-updated image;
generate image boundary prior information by performing at least two sparse transforms on the initially-updated image; and
perform a weighted reconstruction on the image boundary prior information and the initially-updated image to generate a reconstructed image.

11. The device of claim 10, wherein the at least two sparse transforms comprise a gradient transform and a wavelet transform.

12. The device of claim 10, wherein when generating the image boundary prior information, the machine executable instructions cause the processor to:
perform a gradient transform on the initially-updated image to generate a PET gradient image;
perform a wavelet transform on the PET gradient image to generate first sub-images in a wavelet domain;
denoise the first sub-images in the wavelet domain to generate denoised first sub-images in the wavelet domain; and
perform a wavelet inverse transform on the denoised first sub-images in the wavelet domain to generate an updated gradient image,
wherein the updated gradient image comprises the image boundary prior information.

13. The device of claim 12, wherein the weighted reconstruction performed on the image boundary prior information and the initially-updated image is iterative and is based on an iterative update formula, wherein the image boundary prior information functions as a weighting factor to iteratively update the initially-updated image.

14. The device of claim 10, wherein when performing the weighted reconstruction on the image boundary prior information and the initially-updated image, the machine executable instructions cause the processor to:
perform a wavelet transform on the initially-updated image to generate initial sub-images in a wavelet domain;
denoise the initial sub-images in the wavelet domain to generate denoised initial sub-images in the wavelet domain;
perform a wavelet inverse transform on the denoised initial sub-images in the wavelet domain to generate an initial boundary image; and
perform a gradient transform on the initial boundary image to generate an updated gradient image,
wherein the updated gradient image comprises the image boundary prior information.

15. The device of claim 14, wherein the weighted reconstruction performed on the image boundary prior information and the initially-updated image is iterative and is based on an iterative update formula, wherein the image boundary prior information functions as a weighting factor to iteratively update the initially-updated image.

16. The device of claim 10, wherein when generating the image boundary prior information, the machine executable instructions cause the processor to:
perform a gradient transform on the initially-updated image to generate a PET gradient image;
perform a wavelet transform on the PET gradient image to generate first sub-images in a wavelet domain; and
denoising the first sub-images in the wavelet domain to generate denoised first sub-images in the wavelet domain,
wherein the denoised first sub-images comprises the wavelet domain as the image boundary prior information.

17. The device of claim 16, wherein when performing the weighted reconstruction on the image boundary prior information and the initially-updated image, the machine executable instructions cause the processor to:
perform a wavelet transform on the initially-updated image to generate second sub-images in the wavelet domain;
perform a weighted stacking operation on each of the denoised first sub-images with one of the second sub-images at corresponding frequency bands in the wavelet domain to generate weighted PET wavelet sub-images; and
perform a wavelet inverse transform on the weighted PET wavelet sub-images to generate the reconstructed image.

18. The device of claim 16, wherein when performing the weighted reconstruction on the image boundary prior information and the initially-updated image, the machine executable instructions cause the processor to:
denoise the initially-updated image;
perform a wavelet transform on the denoised initially-updated image to generate third sub-images in the wavelet domain;
perform a weighted stacking operation on each of the denoised first sub-images with one of the third sub-images at corresponding frequency bands in the wavelet domain to generate weighted PET wavelet sub-images; and
perform a wavelet inverse transform on the weighted PET wavelet sub-images to generate the reconstructed image.

19. A machine-readable storage medium coupled to a processor and having machine-executable instructions stored thereon that, when executed by the processor, cause the processor to perform operations comprising:
obtaining scanning data generated by scanning a subject;
processing the scanning data to generate an initially-updated image;
generating image boundary prior information by performing at least two sparse transforms on the initially-updated image; and
performing a weighted reconstruction on the image boundary prior information and the initially-updated image to generate a reconstructed image.

* * * * *